(12) United States Patent
Dreyer et al.

(10) Patent No.: US 10,214,191 B2
(45) Date of Patent: Feb. 26, 2019

(54) VALVE UNIT FOR MODULATING THE PRESSURE IN A PNEUMATIC BRAKE SYSTEM

(71) Applicant: WABCO GmbH, Hannover (DE)

(72) Inventors: Werner Dreyer, Garbsen (DE); Karsten Runge, Springe (DE); Andreas Teichmann, Isernhagen (DE)

(73) Assignee: WABCO GmbH, Hannover (DE)

( * ) Notice: Subject to any disclaimer, the term of this patent is extended or adjusted under 35 U.S.C. 154(b) by 0 days.

(21) Appl. No.: 15/506,029

(22) PCT Filed: Aug. 6, 2015

(86) PCT No.: PCT/EP2015/001626
§ 371 (c)(1),
(2) Date: Feb. 23, 2017

(87) PCT Pub. No.: WO2016/029992
PCT Pub. Date: Mar. 3, 2016

(65) Prior Publication Data
US 2017/0253224 A1    Sep. 7, 2017

(30) Foreign Application Priority Data
Aug. 27, 2014  (DE) .................. 10 2014 012 711

(51) Int. Cl.
*B60T 8/34* (2006.01)
*B60T 8/36* (2006.01)
(52) U.S. Cl.
CPC .............. *B60T 8/342* (2013.01); *B60T 8/362* (2013.01); *B60T 8/3605* (2013.01); *B60T 8/3675* (2013.01)

(58) Field of Classification Search
CPC .......... B60T 8/3675; B60T 8/368; B60T 8/36
(Continued)

(56) References Cited

U.S. PATENT DOCUMENTS

| 3,977,734 A | 8/1976 | Ronnhult et al. |
| 4,566,865 A * | 1/1986 | Nishitsuji ............. F04B 39/127 248/300 |

(Continued)

FOREIGN PATENT DOCUMENTS

EP    0498584 A1    8/1992

OTHER PUBLICATIONS

European Patent Office, Rijswijk, Netherlands, International Search Report of International Application No. PCT/EP2015/001626, dated Oct. 9, 2015, 3 pages.

*Primary Examiner* — Bradley T King
*Assistant Examiner* — James K Hsiao
(74) *Attorney, Agent, or Firm* — Brinks Gilson & Lione

(57) ABSTRACT

A valve unit (1, 1') for modulating the pressure in a pneumatic brake system, has a brake pressure inlet (3), a brake pressure outlet (4) and a venting outlet (5), a pneumatically controllable main valve (6, 7) and a pilot valve (8, 9), embodied as a solenoid valve and assigned to the main valve (6, 7), which are arranged in a valve housing (2, 2') subdivided by a plane of division (10), into a main housing (11, 11') and a housing cover (12). For fixing the housing cover (12) on the main housing (11, 11') a bracket element (62.1) is fixed to the main housing (11, 11') and bears with a largely planar pressure plate (63) generating an elastic prestressing force on a planar outside wall (64) of the housing cover (12) oriented parallel to the plane of division (10) of the valve housing (2, 2').

16 Claims, 10 Drawing Sheets

(58) Field of Classification Search
USPC .............................. 303/119.1–119.3, DIG. 10
See application file for complete search history.

(56) References Cited

U.S. PATENT DOCUMENTS

| | | | | |
|---|---|---|---|---|
| 4,626,045 | A * | 12/1986 | Takei | B60T 13/686 |
| | | | | 188/344 |
| 5,007,455 | A * | 4/1991 | Hawker | B60T 8/361 |
| | | | | 137/596.16 |
| 5,022,717 | A * | 6/1991 | Heibel | B60T 8/368 |
| | | | | 303/119.3 |
| 5,066,076 | A * | 11/1991 | Troster | B60R 11/00 |
| | | | | 180/274 |
| 5,348,043 | A * | 9/1994 | Chimera | B60T 17/043 |
| | | | | 137/269 |
| 5,695,259 | A | 12/1997 | Isshiki et al. | |
| 5,725,290 | A * | 3/1998 | Thomas | B60T 8/3675 |
| | | | | 303/119.2 |
| 5,769,508 | A | 6/1998 | Gilles et al. | |
| 5,921,639 | A | 7/1999 | Hosoya | |
| 6,254,048 | B1 * | 7/2001 | Ashley | B60T 8/3605 |
| | | | | 248/300 |
| 6,805,414 | B2 * | 10/2004 | Herbst | B60T 17/043 |
| | | | | 303/119.3 |
| 7,334,848 | B2 | 2/2008 | Segawa et al. | |
| 8,672,421 | B2 | 3/2014 | Eidenschink et al. | |
| 9,194,508 | B2 * | 11/2015 | Andersen | F16K 27/003 |
| 2003/0020325 | A1 | 1/2003 | Herbst et al. | |
| 2004/0163470 | A1 * | 8/2004 | Babala | B60G 17/019 |
| | | | | 73/514.01 |

* cited by examiner

VALVE UNIT FOR MODULATING THE PRESSURE IN A PNEUMATIC BRAKE SYSTEM

TECHNICAL FIELD

The invention relates to a valve unit for modulating the pressure in a pneumatic brake system, having a brake pressure inlet, a brake pressure outlet and a venting outlet, together with at least one pneumatically controllable main valve and a pilot valve, embodied as a solenoid valve and assigned to the main valve, which are arranged in a valve housing, which is subdivided by a plane of division, largely horizontal in the fitted position, into a main housing and a housing cover, wherein the brake pressure inlet, the brake pressure outlet and the venting outlet are arranged in the main housing, the main valve is arranged in the main housing between the brake pressure inlet and the brake pressure outlet with an actuation axis oriented perpendicular to the plane of division, the pilot valve is arranged in the housing cover, and at least one control chamber of the main valve is delimited by an inside wall of the housing cover facing the plane of division.

BACKGROUND

A valve unit of the aforementioned type may be a pressure control valve an antilock brake system in a vehicle, in which two main valves arranged in the main housing, that is to say an inlet valve and an outlet valve, are embodied as diaphragm valves with diaphragms arranged largely in the plane of division, and in which the pilot valves assigned to these and arranged in the housing cover are embodied as 3/2-way directional control solenoid valves. The vehicle may be a motor vehicle or a rail vehicle.

A pressure control valve of an antilock brake system has the three switching functions: "pressure build-up", "pressurization" and "pressure reduction". In the "pressure build-up" switching function of the valve unit the inlet valve is opened and the outlet valve is closed, so that the brake pressure generated by way of a brake valve on the brake pressure inlet is relayed in full by the pressure control valve to the brake pressure outlet and to at least one wheel brake cylinder connected thereto.

Since the "pressure build-up" switching function corresponds to the rest state of the valve unit, the pilot valve of the inlet valve with its solenoid in the unenergized state connects the control chamber of the inlet valve to a control line carrying the low control pressure. In exactly the same way the pilot valve of the outlet valve with its solenoid in the unenergized state connects the control chamber of the outlet valve to a control line carrying the high control pressure. In the "pressurization" switching function of the pressure control valve the inlet valve and the outlet valve are closed, so that the brake pressure prevailing on the brake pressure outlet and at least the one wheel brake cylinder connected thereto can then be kept constant. For setting this switching function, only the pilot valve of the inlet valve is switched over by energizing its solenoid, thereby admitting the high control pressure to the control chamber of the inlet valve. In the "pressure reduction" switching function of the pressure control valve the inlet valve is closed and the outlet valve is opened, so that the brake pressure outlet and at least the one wheel brake cylinder connected thereto are then vented. For setting this switching function, both pilot valves are switched over by energizing their solenoids, thereby admitting the high control pressure to the control chamber of the inlet valve and the low control pressure (ambient pressure) to the control chamber of the outlet valve.

The "pressurization" and "pressure reduction" switching functions of the pressure control valve are antilock brake functions, which are intended to prevent locking of at least the one assigned wheel during braking. These switching functions are controlled through a corresponding activation of the pilot valves by a control module of the antilock brake system, in which the signals from wheel brake sensors are evaluated in order to detect any imminent or incipient locking of the braked wheels.

Such a valve unit is described, for example, in DE 25 17 571 A1. In this known valve unit an elongated valve housing is subdivided by a plane of division, horizontal in the fitted position, into a housing lower part and a housing upper part. The brake pressure inlet and the venting outlet are arranged, horizontally oriented, largely axially opposite in a longitudinal direction and the brake pressure outlet is arranged, likewise horizontally oriented, largely centrally at right angles thereto in the housing lower part. The diaphragm valves are arranged in series, in the longitudinal direction of the valve housing, in the housing lower part between the brake pressure inlet and the venting outlet, with parallel actuation axes and an arrangement of the diaphragms in a common diaphragm plane, largely corresponding to the plane of division, clamped between the housing lower part and the housing upper part. The pilot valve of the inlet valve and the pilot valve of the outlet valve are arranged, each with their actuation axis oriented vertically and identical switching directions, above the respectively assigned diaphragm valve radially adjacent to one another in the housing upper part.

In a further such valve unit disclosed in EP 0 498 584 B1 the valve housing is subdivided by a plane of division, vertical in the fitted position, into an inlet housing and an outlet housing. The brake pressure inlet is arranged horizontally oriented in the top of the inlet housing. The brake pressure outlet is arranged horizontally oriented in the outlet housing largely axially opposite the brake pressure inlet, whereas the venting outlet is arranged, directed vertically downwards, in the outlet housing. The diaphragm valves are arranged one vertically above the other in the outlet housing between the brake pressure outlet and the venting outlet with parallel actuation axes and an arrangement of the diaphragms in a common diaphragm plane, largely corresponding to the plane of division, clamped between the outlet housing and the inlet housing. The pilot valve of the inlet valve and the pilot valve of the outlet valve are arranged radially adjacent to one another in the inlet housing, each with their actuation axes horizontally oriented and opposed switching directions, approximately centrally at right angles to the compressed air inlets and compressed air outlets and parallel to the plane of division. The solenoids of the pilot valves are arranged in a solenoid block, which is arranged together with the inserted mechanical components of the solenoid valves between a housing upper part and a housing lower part of the inlet housing. For sealing purposes, seals or sealing rings are arranged between the solenoid block, the valve blocks, and the valve seats of the solenoid valves on the one hand, and the housing upper part and the housing lower part of the inlet housing on the other. For fixing the housing upper part and the housing lower part to the solenoid block of the solenoid valves on the one hand, and for clamping the diaphragms of the diaphragm valves on the other, the housing upper part and the housing lower part of the inlet housing are each bolted to the outlet housing.

Finally, DE 10 2008 028 439 B3 describes such a valve unit, in which an elongated valve housing is subdivided by planes of division, largely horizontal in the fitted position, into a housing lower part, a housing upper part and an intermediate plate arranged between them. The brake pressure inlet, the brake pressure outlet and the venting outlet are arranged, each horizontally oriented, in the housing lower part. The diaphragm valves are arranged in series in a longitudinal direction in the housing lower part, with parallel actuation axes and an arrangement of the diaphragms in a common diaphragm plane, largely corresponding to the plane of division between the housing lower part and the intermediate plate, clamped between the housing lower part and the intermediate plate. The pilot valve of the inlet valve and the pilot valve of the outlet valve are arranged radially adjacent to one another in the housing upper part, each with their actuation axes oriented vertically and identical switching directions, approximately centrally above the diaphragm valves. The intermediate plate is bolted to the housing lower part. The housing upper part is bolted via an outer cover to the intermediate plate or to the housing lower part. Seals are arranged in the plane of division between the housing upper part and the intermediate plate.

A valve unit of the aforementioned type may also be a relay valve, however, in which a main valve arranged in the main housing are embodied as a piston valve having a piston displaceably supported in the actuation axis and a spring-loaded double-acting valve that can be actuated by the former, and in which the assigned pilot valve, arranged in the housing cover, is embodied as a 3/2-way directional control solenoid valve. The function of a relay valve, given the high brake cylinder volumes of the wheel brake cylinders connected to the brake pressure outlet, is to reduce the response time in braking operations and also when releasing the brakes, that is to say to bring about a rapid ventilation and venting of the connected wheel brake cylinders.

The valve unit of the type here under consideration comprises two interconnected main components, that is to say the main housing having the compressed air connections and containing at least the one main valve, and the housing cover containing at least one pilot valve. The main housing is for the most part manufactured as a die-cast light-alloy component. The housing cover is usually composed of a plastic, which serves for overmolding an insert containing at least the one pilot valve, for example. The housing cover is normally connected to the main housing by means of a bolted flange connection, in which bolts inserted into flange holes in the housing cover are bolted to threaded holes in the main housing. Due to the stresses imposed by the control pressures prevailing in the control chamber of the main valve, however, a bolted flange connection requires a relatively large number of bolts. Added to this is the fact that owing to the flow properties of the plastic the flange holes in the housing cover need to be reinforced with metal sleeves, in order to prevent damage to the housing cover. Using M6 bolts, a flange hole diameter of 6.5 mm and a metal sleeve wall thickness of 1.5 mm, this disadvantageously results, with two opposing bolts, in an additional width of the housing cover of 19 mm, even before taking into account the dimensions of the bolt heads.

SUMMARY OF THE INVENTION

The object of the invention, therefore, in a valve unit for modulating the pressure in a pneumatic brake system of the aforementioned type, is to propose a compact device that is cost-effective to produce for fixing the housing cover on the main housing.

This object is achieved by providing a bracket element, which in the assembled state is fixed to the main housing, for fixing the housing cover on the main housing and which bears with a largely planar pressure plate generating an elastic prestressing force on a planar outside wall of the housing cover oriented parallel to the plane of division of the valve housing.

The invention accordingly proceeds from a valve unit known in the art for modulating the pressure in a pneumatic brake system, which comprises a brake pressure inlet, a brake pressure outlet and a venting outlet together with at least one pneumatically controllable main valve and a pilot valve, embodied as a solenoid valve and assigned to the main valve. The compressed air inlets and compressed air outlets together with at least the main valve and the assigned pilot valve are arranged in a valve housing, which is subdivided by a plane of division, largely horizontal in the fitted position, into a main housing and a housing cover. The brake pressure inlet and the brake pressure outlet together with the venting outlet are arranged in the main housing. At least the one main valve is arranged in the main housing between the brake pressure inlet and the brake pressure outlet with an actuation axis oriented perpendicular to the plane of division. At least the one pilot valve is arranged in the housing cover. And at least one control chamber of the main valve is delimited by an inside wall of the housing cover facing the plane of division.

This valve unit may be a control valve of an antilock brake system, which comprises two main valves embodied as diaphragm valves, that is to say an inlet valve and an outlet valve, together with two pilot valves each embodied as a 3/2-way directional control solenoid valve. The valve unit may equally well be a relay valve, however, which comprises a main valve embodied as a piston valve together with a pilot valve embodied as a 3/2-way directional control solenoid valve.

In a departure from the usual fixing of the housing cover on the main housing via a bolted flange connection, which is relatively expensive because of the many bolts, threaded holes and flange portions required for this, and which increases the overall dimensions of the valve housing, the invention now proposes that the housing cover be connected to the main housing by a bracket element. In the assembled state the bracket element is fixed to the main housing and then bears with a largely planar pressure plate generating an elastic prestressing force on a planar outside wall of the housing cover oriented parallel to the plane of division of the valve housing.

The housing cover is therefore now fixed to the main housing substantially via a single component, that is to say the bracket element. Here the prestressing force applied during assembly, which serves to press the housing cover and the main housing against one another largely perpendicular to the plane of division, ensures that close to the plane of division, for example, diaphragms of diaphragm valves clamped between the main housing are securely fixed, and that no compressed air can escape from control chambers of the main valves delimited by the inside wall of the housing cover and from control ports crossing the plane of division.

As will become clear below, the bracket element may be of relatively thin-walled construction. In the assembled state it bears relatively tightly on the valve housing. Compared to a bolted flange connection having eight bolts, for example, the process of fitting the housing cover on the main housing is therefore made significantly easier and saves overall space. In the same way the valve housing can thereby be opened and then closed again with little assembly effort required for servicing and repair purposes, particularly for an overhaul of the valve unit, in which the diaphragms of diaphragm valves can be renewed, for example.

According to a first and a second embodiment the bracket element is in each case provided with an articulated arm on each side in the longitudinal direction of the valve housing, the arms laterally enclosing the housing cover and the main housing and being pivotally fixed to the main housing via an axis of articulation in each case engaging in an articulation hole. In a longitudinal direction opposite the articulated arms each bracket element can be rigidly fixed to the main housing in a different manner.

In the first embodiment the bracket element, in a longitudinal direction opposite the articulated arms, is provided with a fixing clip, which is oriented largely parallel to the pressure plate and has at least one hole, which serves for bolting the bracket element to the main housing via a bolt, generating an elastic prestressing force.

In order to keep the dimensions of the fixing clip small and to keep the bracket element stable, the main housing in this first embodiment, in a longitudinal direction opposite the axis of articulation, advantageously comprises a columnar projection, which extends perpendicularly beyond the plane of division in the direction of the housing cover and is provided with at least one threaded hole for bolted fastening of the fixing clip.

In the second embodiment of the device according to the invention for fixing the housing cover on the main housing, the bracket element, in a longitudinal direction opposite the articulated arms, is provided with a fixing clip, which is bent largely perpendicular to the pressure plate in the direction of the plane of division and which comprises a locking hook directed inwards on the cover side, which serves for latching the bracket element to the main housing through engagement in an opposing latching recess, generating an elastic prestressing force.

In order to keep the dimensions of the fixing clip small and to keep the bracket element stable in this case also, the main housing in this embodiment, in a longitudinal direction opposite the axis of articulation, advantageously comprises a planar projection, which extends perpendicularly beyond the plane of division in the direction of the housing cover and is provided with the latching recess for latching of the fixing clip.

For cost-effective manufacture and an overall space-saving design of the bracket element, the mode of fixing the housing cover on the main housing in both embodiments provides for manufacture of the bracket element together with the pressure plate, the articulated arms and the fixing clip in one piece as a sheet-metal pressing and sheet-metal stamping, for example from sheet steel or sheet aluminum.

The articulation holes in the articulated arms are each advantageously provided with a cylindrical passage or sleeve. This increases the contact surfaces between the articulation holes and the axis of articulation, compared to simply punching out the articulation holes, and therefore prevents damage and wear to the articulation holes.

According to a third embodiment of the fixing device according to the invention the bracket element, in the longitudinal direction of the valve housing, is provided with two fixing arms on each side, which laterally enclose the housing cover and the main housing and with inwardly elbowed bends each grip around a largely planar base wall of the main housing remote from the plane of division, and at the end engage in assigned openings in a planar base plate, which is fixed to the base wall of the main housing. In this variant the elastic prestressing force for holding the main housing and the housing cover together is generated in that the fixing arms of the bracket element have to be tensioned in order to be able to push their elbowed bends over the outside edge of the base wall. The end engagement of the elbowed bends in the openings in the base plate and the fixing of the base plate to the base wall of the main housing mean that the fixing arms are secured through positive interlock to prevent their working loose or slipping off over the outside edge of the base wall.

The base plate has at least one hole on each side in a longitudinal direction, which serves for bolting the base plate to the main housing via a bolt on each side.

If the main housing comprises at least one connecting duct opening outwards through an opening in the base wall, this connecting duct of the main housing is preferably closed by the base plate in the assembled state, and sealing elements are arranged between housing walls of the main housing, defining the connecting duct, and the base plate.

For cost-effective manufacture and an overall space-saving design of the bracket element and the base plate, in this variant of the fixing device the bracket element with the fixing arms and the base plate are manufactured in one piece at a time as a sheet-metal pressing and sheet-metal stamping, for example from sheet steel or sheet aluminum.

In all the aforementioned embodiments the pressure plate of the bracket element may be arched in the direction of the outside wall of the housing cover in order to afford a central introduction of an elastic prestressing force.

Alternatively, the pressure plate of the bracket element may also comprise at least one convexity, directed towards the outside wall of the housing cover, for localized introduction of an elastic prestressing force.

For optimal introduction of the elastic prestressing force into the housing cover, at least the one convexity is preferably formed in the pressure plate in such a position that in the assembled state of the bracket element it lies largely centrally over a control chamber of a main valve delimited by the inside wall of the housing cover. In the case of a pressure control valve of an antilock brake system having two main valves arranged in series in the longitudinal direction of the valve housing and each embodied as a diaphragm valve, that is to say having an inlet valve and an outlet valve, the diaphragms of which are arranged largely in the plane of division of the valve housing, and the actuation axes of which are oriented axially parallel to one another and perpendicular to the plane of division, the pressure plate of the bracket element accordingly advantageously comprises two convexities, which in the assembled state of the bracket element lie centrally in relation to the actuation axes of the diaphragm valves and therefore centrally over the assigned control chambers.

The housing cover may furthermore comprise a central insert provided with valve bores and control ports, into which the solenoids and the mechanical components of the pilot valves, such as the respective valve core, the respective valve armature and the respective valve spring, are inserted and which is overmolded with a plastic.

Finally, the brake pressure inlet and the brake pressure outlet may be arranged, horizontally oriented in the main housing, largely axially opposite in a longitudinal direction and with the venting outlet directed vertically downwards between them.

To further explain the invention, drawings showing several exemplary embodiments are attached to the description.

The drawings are provided herewith for purely illustrative purposes and are not intended to limit the scope of the present invention.

DETAILED DESCRIPTION OF THE DRAWINGS

Figure 8:
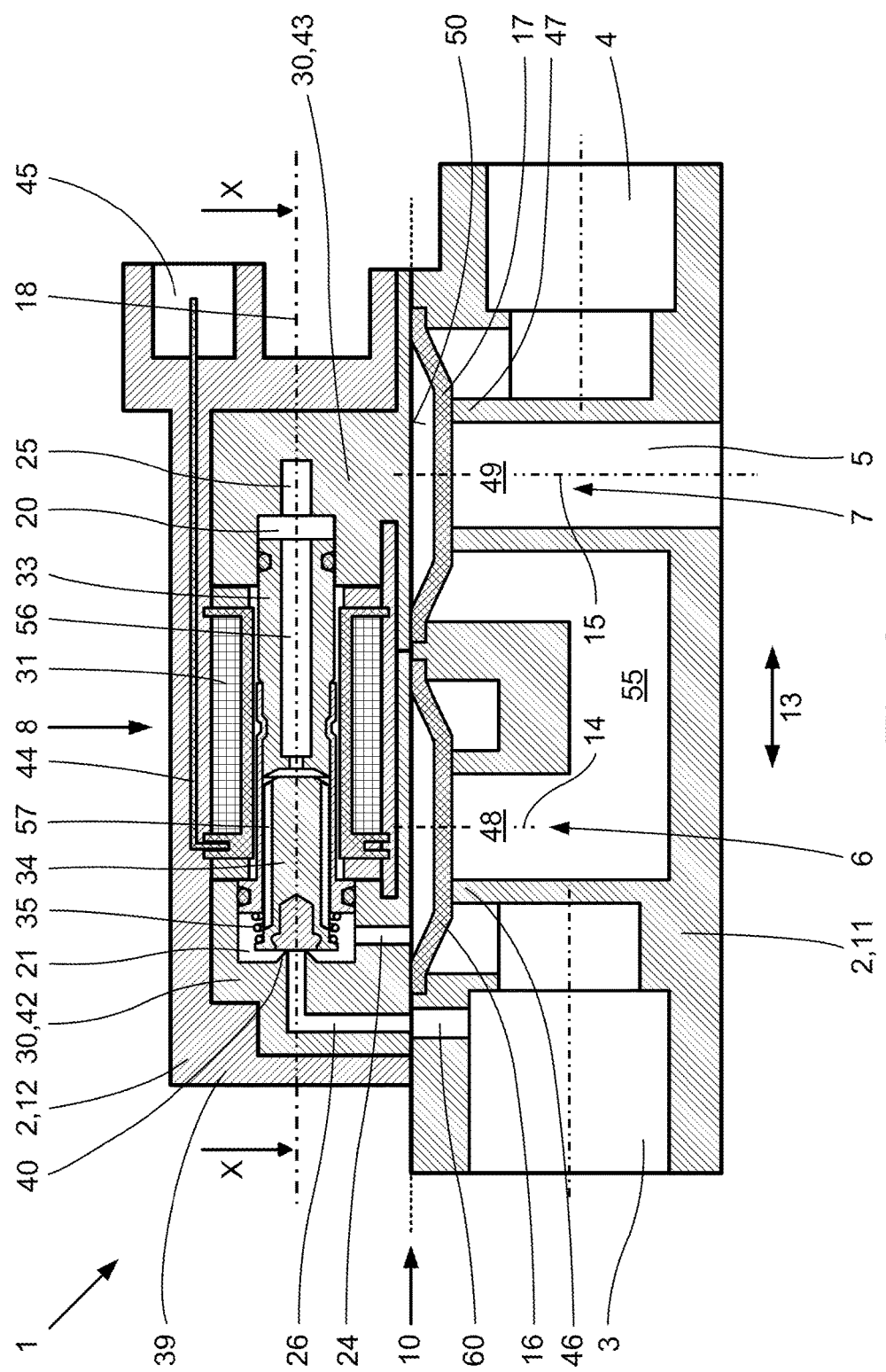
FIG. 8 shows a first vertical longitudinal section of one embodiment of a valve unit by way of example.

The basic construction and working principle of a valve unit 1 is first described below, referring to FIGS. 8 to 10, and this is then used by way of example to explain the inventive fixing of a housing cover 11 on a main housing 12. The valve unit 1 is represented in FIG. 8 in a first vertical longitudinal section VIII-VIII according to FIG. 10, and in FIG. 9 in a second vertical longitudinal section IX-IX according to FIG. 10, whilst the valve unit in FIG. 10 is depicted in a horizontal section X-X according to FIG. 8 and FIG. 9.

A brake pressure inlet 3, a brake pressure outlet 4 and a venting outlet 5, together with an inlet valve 6 embodied as a diaphragm valve, an outlet valve 7 embodied as a diaphragm valve and a pilot valve 8, 9 for each diaphragm valve 6, 7, each embodied as a 3/2-way directional control solenoid valve, are arranged in an elongated valve housing 2. The valve housing 2 is subdivided by a plane of division 10, largely horizontal in the fitted position, into a main housing 11 and a housing cover 12. The brake pressure inlet 3 and the brake pressure outlet 4 are arranged horizontally oriented in the main housing 11, largely axially opposite in the longitudinal direction 13 of the valve housing 2 and with the venting outlet 5 directed vertically downwards between them. The diaphragm valves 6, 7 are arranged in series in the longitudinal direction 13 in the main housing 11 between the brake pressure inlet 3 and the brake pressure outlet 4 with parallel actuation axes 14, 15 and an arrangement of the diaphragms 16, 17 in a common diaphragm plane largely corresponding to the plane of division 10, clamped between the main housing 11 and the housing cover 12. The pilot valves 8, 9, on the other hand, are arranged in the housing cover 12.

The pilot valve 8 of the inlet valve 6 and the pilot valve 9 of the outlet valve 7 are arranged in a longitudinal direction 13 in the housing cover 12, with their actuation axes 18, 19 oriented parallel to the plane of division 10, largely centrally over the diaphragms 16, 17 of the inlet valve 6 and of the outlet valve 7. The housing cover 12 comprises a central insert 30 provided with valve bores 20, 21; 22, 23 and control ports 24, 25, 26; 27, 28, 29, into which insert the solenoids 31, 32 and the mechanical components of the pilot valves 8, 9, such as the respective valve core 33, 36, the respective valve armature 34, 37, and the respective valve spring 35, 38, are inserted, and which is overmolded with a plastic 39.

Here the two pilot valves 8, 9 are embodied as separate solenoid valves, which are arranged in the insert 30 with opposing switching directions and each axially parallel valve seat 40, 41 facing the diaphragm 16, 17 of the assigned inlet or outlet valve 6, 7 and radially adjacent to one another. The insert 30 comprises an inlet-side part 42 and an outlet-side part 43, which enclose the solenoids 31, 32 and said mechanical components 33, 34, 35; 36, 37, 38 of the solenoid valves 8, 9 at the end face. Connecting cables 44 of the solenoids 31, 32, which terminate in a connection socket 45 molded on with the overmolding 39, are laid inside the overmolding 39 of the housing cover 12.

The formed shape of the diaphragms 16, 17 of the inlet valve 6 and the outlet valve 7 means that they each bear on a valve seat 46, 47 of a cylindrical central duct 48, 49, which in each case, through the admission of a low or high control pressure to a control chamber 51, 52, delimited by the relevant diaphragm 16, 17 and an inside wall 50 of the housing cover 12 facing the plane of division 10, can be connected to or shut off from a cylindrical ring duct 53, 54 arranged coaxially therewith.

The ring duct 53 of the inlet valve 6 is connected to the brake pressure inlet 3. The central duct 48 of the inlet valve 6 is connected via a connecting duct 55 to the ring duct 54 of the outlet valve 7, which in turn is connected to the brake pressure outlet 4. The central duct 49 of the outlet valve 7 is connected to the venting outlet 5. The brake pressure outlet 4 can therefore be alternately connected to or shut off from the brake pressure inlet 3 by the inlet valve 6. In the same way the brake pressure outlet 4 can be alternately connected to or shut off from the venting outlet 5 by the outlet valve 7. In the embodiment of the valve unit 1 here, the insert 30 of the housing cover 12 extends up to the plane of division 10 between the main housing 11 and the housing cover 12 and entirely defines the control chambers 51, 52 of the diaphragm valves 8, 9.

The valve unit 1 has the switching functions "pressure build-up", "pressurization" and "pressure reduction". In the "pressure build-up" switching function of the valve unit 1 the inlet valve 6 is opened and the outlet valve 7 is closed, so that the brake pressure generated by way of a brake valve on the brake pressure inlet 3 is relayed in full to the brake pressure outlet 4 and to at least one wheel brake cylinder connected thereto. Since the "pressure build-up" switching function corresponds to the rest state of the valve unit 1, the pilot valve 8 of the inlet valve 6 with its solenoid 31 in the unenergized state connects the control chamber 51 of the inlet valve 6 to a low control pressure-carrying control port 25, which is connected in a manner not shown to the venting outlet 5, via the control port 24, the valve bore 21, longitudinal grooves 57 in the valve armature 34 and a central bore 56 in the valve core 33. The diaphragm 16, represented in the FIGS. 8 and 9 as bearing by reason of its shape on the valve seat 46 of the inlet valve 6, is in this case pushed in the direction of the control chamber 51 by a brake pressure prevailing in the ring duct 53, thereby opening the inlet valve 6.

In the same way the pilot valve 9 of the outlet valve 7 with its solenoid 32 in the unenergized state connects the control chamber 52 of the outlet valve 7, via the control port 27, the valve bore 23, longitudinal grooves 59 in the valve armature 37, and a central bore 58 in the valve core 36, to a high control pressure-carrying control port 29, which is connected via a further control port 61 arranged in the main housing 11 to the brake pressure inlet 3.

In the "pressurization" switching function of the valve unit 1 the inlet valve 6 and the outlet valve 7 are closed, so that the brake pressure present on the brake pressure outlet 4 and at least the one wheel brake cylinder connected thereto is then kept constant. For setting this switching function, only the pilot valve 8 of the inlet valve 6 is switched over by energizing its solenoid 31, so that the relevant valve armature 34 is pulled axially inwards away from the valve seat 40 against the return force of the valve spring 35. The control chamber 51 of the inlet valve 6 is thereby connected, via the control port 24 and the valve bore 21, to a control port 26 carrying the high control pressure, which is connected via a further control port 60, arranged in the main housing 11, to the brake pressure inlet 3.

In the "pressure reduction" switching function of the valve unit 1 the inlet valve 6 is closed and the outlet valve 7 is opened, so that the brake pressure outlet 4 and at least the one wheel brake cylinder connected thereto are then vented via the venting outlet 5. For setting this switching function, both pilot valves 8, 9 are switched over by energizing their solenoids 31, 32. Energizing the solenoid 32 of the pilot valve 9 assigned to the outlet valve 7 causes the relevant valve armature 37 to be pulled axially inwards away from the valve seat 41 against the return force of the valve spring 38, so that the control chamber 52 of the outlet valve 7 is connected via the control port 27 and the valve bore 23 to a control port 28 carrying the low control pressure, which is connected to the venting outlet 5 in a manner not shown.

The "pressurization" and "pressure reduction" switching functions of the valve unit 1 are antilock brake functions, which are intended to prevent locking of at least the one assigned wheel during braking. These switching functions are controlled through a corresponding activation of the two pilot valves 8, 9 by a control module of the antilock brake system, in which the signals from wheel brake sensors are evaluated in order to detect any imminent or incipient locking of the braked wheels.

The horizontal fitted position of the valve unit 1, that is to say the arrangement of the two pilot valves 8, 9 in a longitudinal direction 13 parallel to the plane of division 10 of the valve housing 2, results in a very low overall height of the valve cover 12 and thereby particularly compact dimensions of the overall valve unit 1. This is particularly advantageous, since in order to achieve a short response time of the relevant wheel brakes in controlling the antilock functions, such valve units 1 are arranged as close as possible to the assigned wheel brake cylinders, where the overall space available is usually small.

The orientation of the solenoid valves 8, 9 with valve seats 40, 41 arranged in proximity to the diaphragms 16, 17 and the control chambers 50, 51 of the assigned diaphragm valves 6, 7 means that both pilot valves 8, 9 have especially small pilot volumes to be ventilated or vented when switching. This advantageously results in particularly short response times of the diaphragm valves 6, 7 when switching over the solenoid valves 8, 9.

The overmolding 39 of the insert 30 containing the solenoids 31, 32 and said mechanical components 33, 34, 35, 36, 37, 38 of the pilot valves 8, 9 substantially facilitates the assembly of the valve unit 1 and its overhaul, in which the diaphragms 16, 17, in particular, are replaced by new ones. Furthermore, the overmolding 39 of the insert 30 allows the connection socket 45 of the solenoids 31, 32 to be arranged with different forms of bushing and different orientation at different locations on the housing cover 12, according to the requirements of the particular vehicle manufacturer. The two solenoid valves 8, 9, moreover, are protected by the plastic overmolding 39 against the ingress of moisture and dirt particles.

Figure 1:
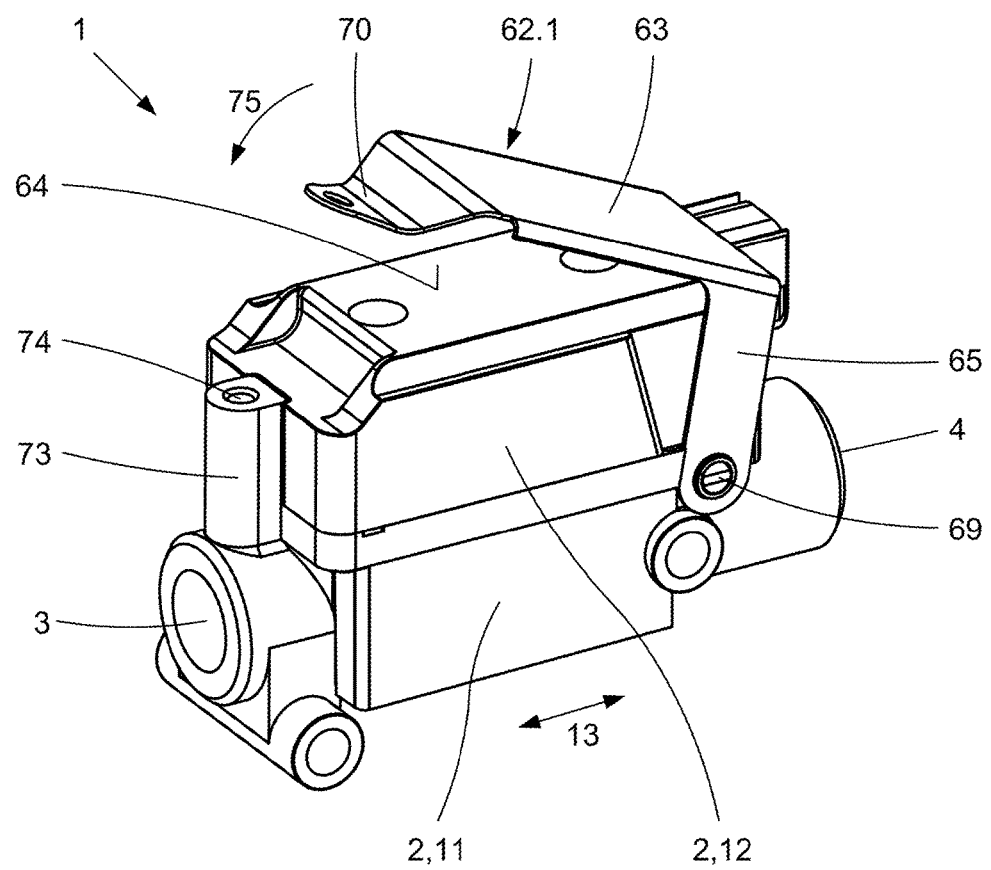
FIG. 1 shows a perspective view of a valve unit having a first embodiment of a bracket element for fixing a housing cover on a main housing.
Figure 2:
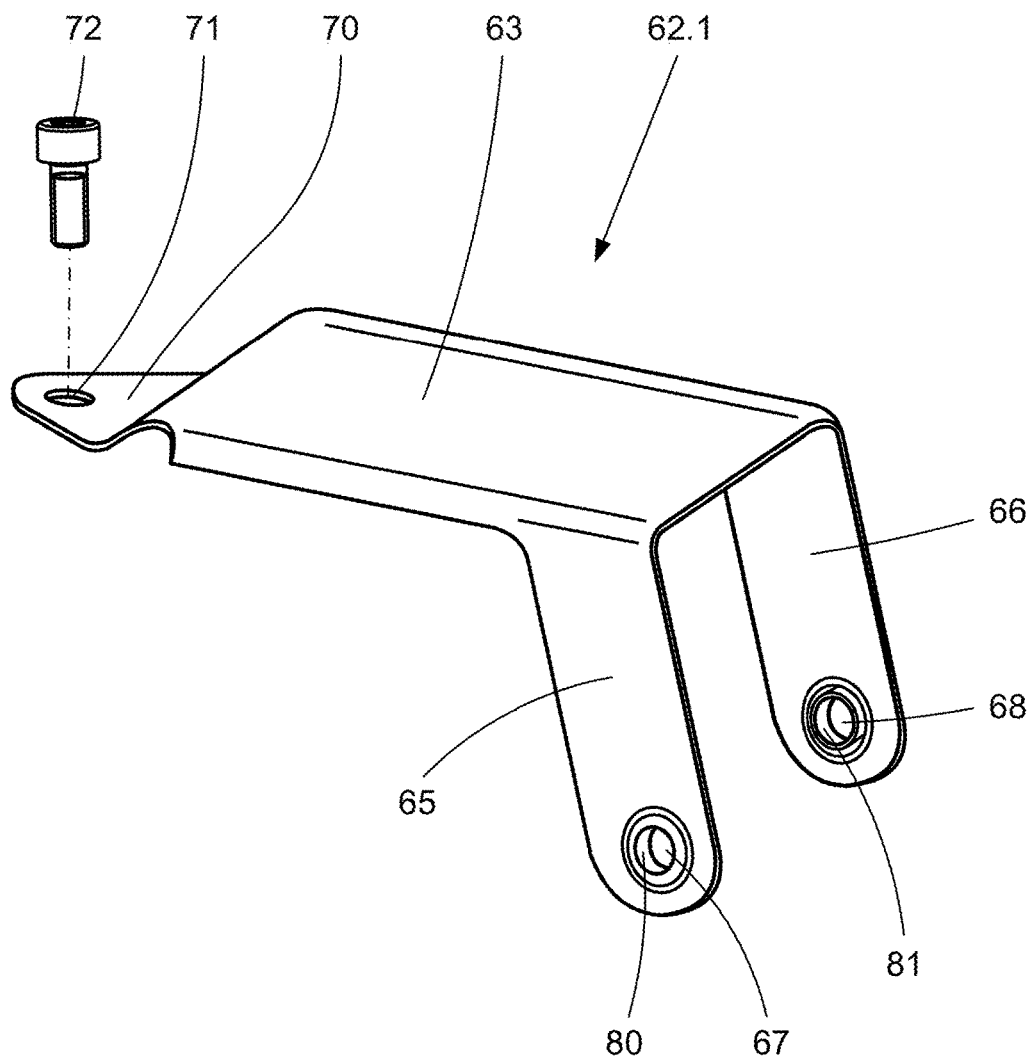
FIG. 2 shows a perspective view of the first variant of the bracket element according to FIG. 1.
Figure 9:
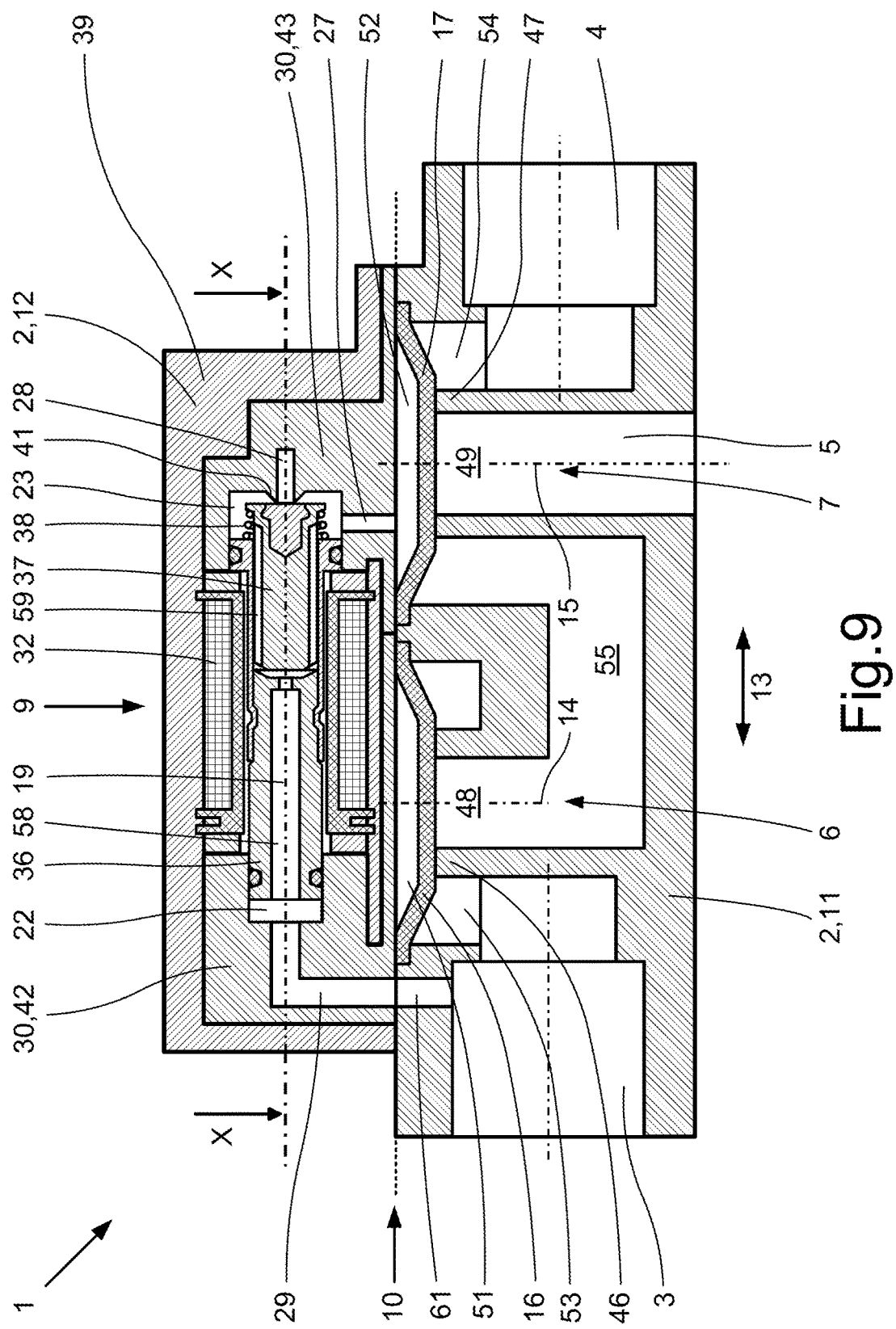
FIG. 9 shows a second vertical longitudinal section of the valve unit according to FIG. 8.
Figure 10:
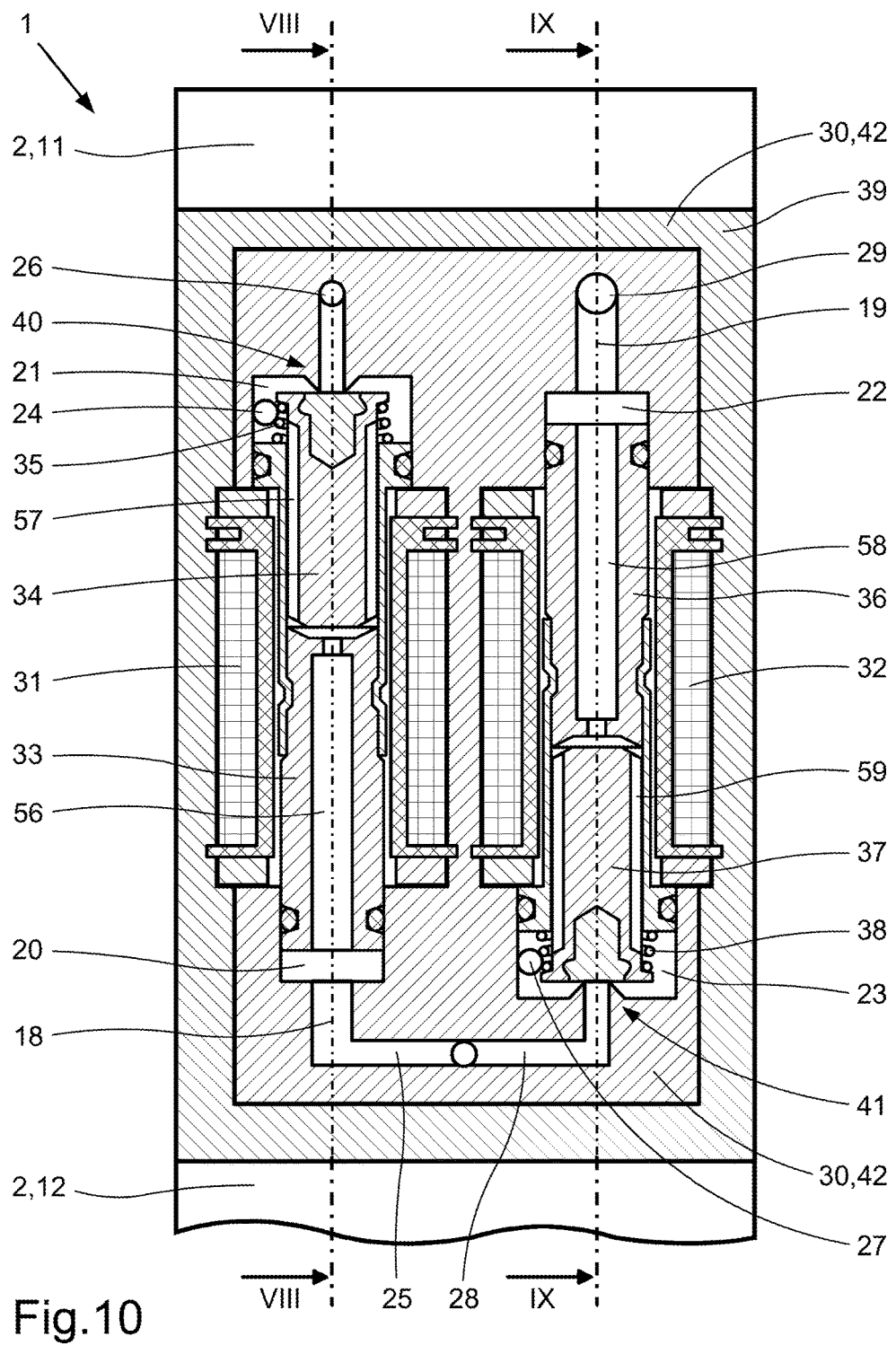
FIG. 10 shows a horizontal section through the valve unit according to FIGS. 8 and 9.

FIG. 1 and FIG. 2 now represent a first embodiment of a fixing device according to the invention, by which the housing cover 12 can be fixed on the main housing 11 of a valve unit 1 corresponding to FIGS. 8 to 10. For this purpose, the valve unit 1 is depicted in detail with a first embodiment of a bracket element 62.1 in FIG. 1 and the bracket element 62.1 in FIG. 2.

In the assembled state the bracket element 62.1 is fixed to the main housing 11 and bears with a largely planar pressure plate 63 generating an elastic prestressing force on a planar outside wall 64 of the housing cover 12 oriented parallel to the plane of division 10 of the valve housing 2. In the longitudinal direction 13 of the valve housing 2, the bracket element 62.1 is provided on one side with two articulated arms 65, 66, which laterally fully enclose the housing cover 12 and partially enclose the main housing 11 and which are pivotally fixed to the main housing 12 by an axis of articulation 69 engaging in each articulation hole 67, 68. In a longitudinal direction 13 opposite the articulated arms 65, 66 the bracket element 62.1 is provided with a fixing clip 70, which is oriented largely parallel to the pressure plate 63 and has a hole 71, via which the bracket element 62.1 can be bolted to the main housing 11 via a bolt 72, generating an elastic prestressing force.

In order to be able to make the fixing clip 70 smaller and thereby make the bracket element 62.1 more stable, the main housing 11, in a longitudinal direction 13 opposite the axis of articulation 69, comprises a columnar projection 73, which extends perpendicularly beyond the plane of division 10 in the direction of the housing cover 12 and is provided with a threaded hole 74 for bolted fastening of the fixing clip 70. As depicted in FIG. 1, the bracket element 62.1 has not yet reached its final assembly position, but still needs to be pivoted according to the arrow 75 until the pressure plate 63 bears on the outside wall 64 of the housing cover 12. The fixing clip 70 is then bolted to the projection 73 of the main housing 11, applying an elastic prestressing force.

The bracket element 62.1 is manufactured in one piece with the pressure plate 63, the two articulated arms 65, 66 and the fixing clip 70 as a sheet-metal pressing and sheet-metal stamping, for example from sheet steel or sheet aluminum, and is therefore of cost-effective and compact design. In order to reduce the surface unit pressure between the articulation holes 67, 68 of the two articulated arms 65, 66 and the axis of articulation 69, the articulation holes 67, 68 are each provided with a cylindrical passage 80, 81 instead of a simple punched hole.

The inventive fixing via the bracket element 62.1 is more cost-effective to manufacture, more rapidly assembled and takes up less overall space than a conventional bolted flange connection of the housing cover 12 to the main housing 11. Furthermore, the valve housing 2 can thereby be opened and then closed again with little assembly effort required for servicing and repair purposes, particularly for an overhaul of the valve unit, in which the diaphragms of diaphragm valves can be renewed, for example.

Figure 3:
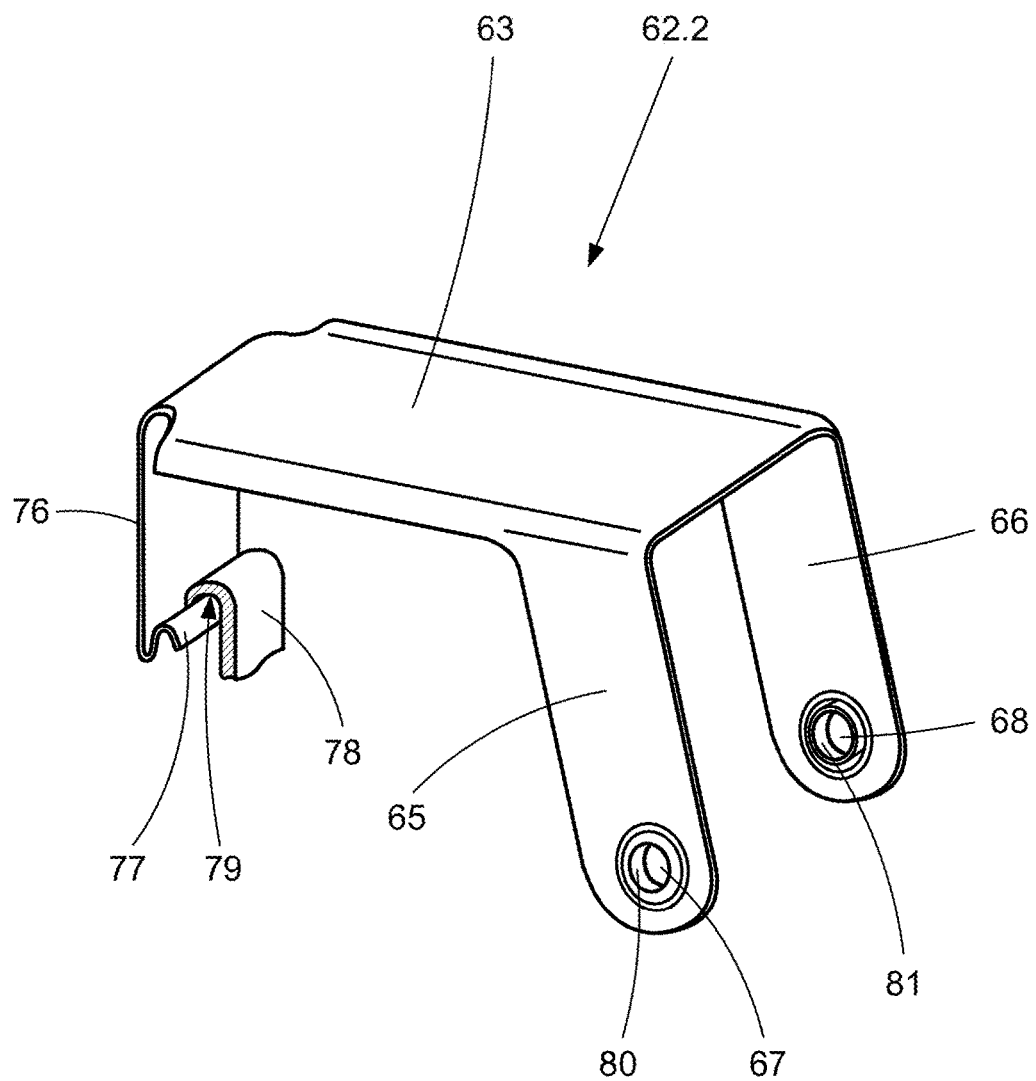
FIG. 3 shows a perspective view of a second variant of a bracket element of a valve unit for fixing a housing cover on a main housing.

A second embodiment of a bracket element 62.2 depicted in FIG. 3 differs from the embodiment according to FIG. 1 and FIG. 2 in that the fixing clip 76 is now bent largely perpendicular to the pressure plate 63 in the direction of plane of division 10. In addition the fixing clip 76 comprises a locking hook 77, inwardly directed on the cover side, via which the bracket element 62.2 can be latched to the main housing 11 through engagement in an opposing latching recess 79, generating an elastic prestressing force. In order to be able to make the fixing clip 76 relatively small and thereby make the bracket element 62.2 more stable, the main housing 11, in a longitudinal direction 13 opposite the axis of articulation 69, comprises a planar projection 78, which extends perpendicularly beyond the plane of division 69 in the direction of the housing cover 12 and is provided with the latching recess 79 for latching of the fixing clip 76.

Figure 4:
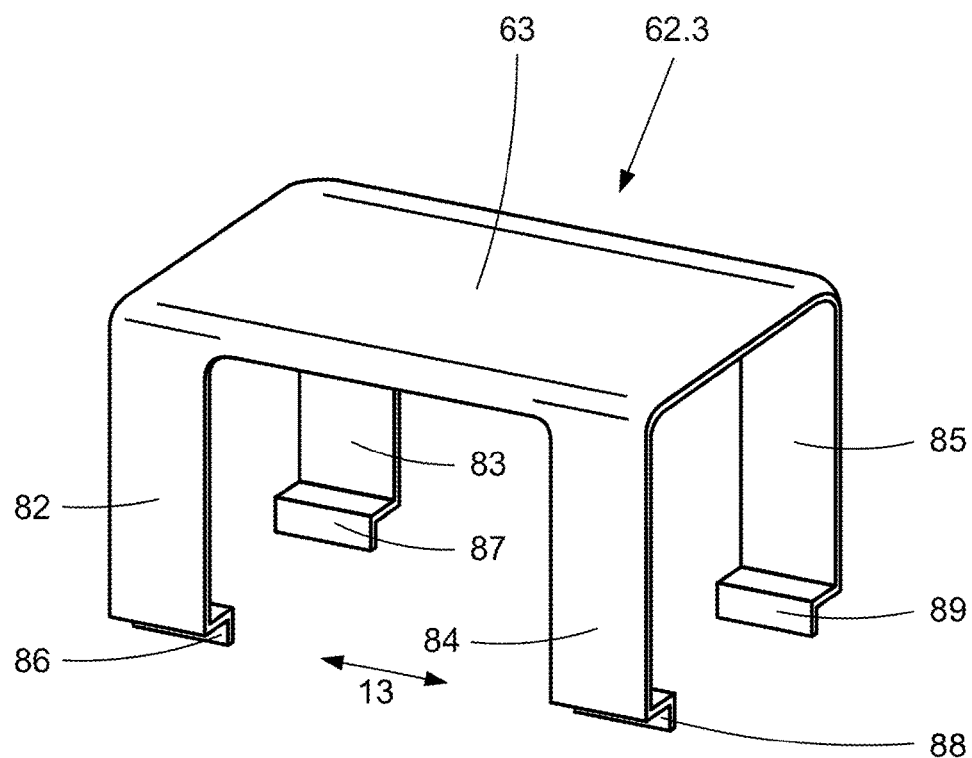
FIG. 4 shows a perspective view of a third variant of a bracket element of a valve unit for fixing a housing cover on a main housing.
Figure 4:
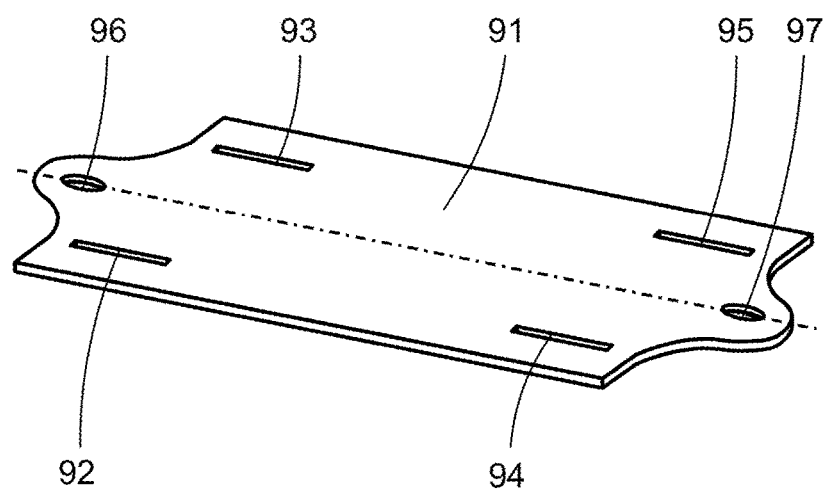
Figure 5:
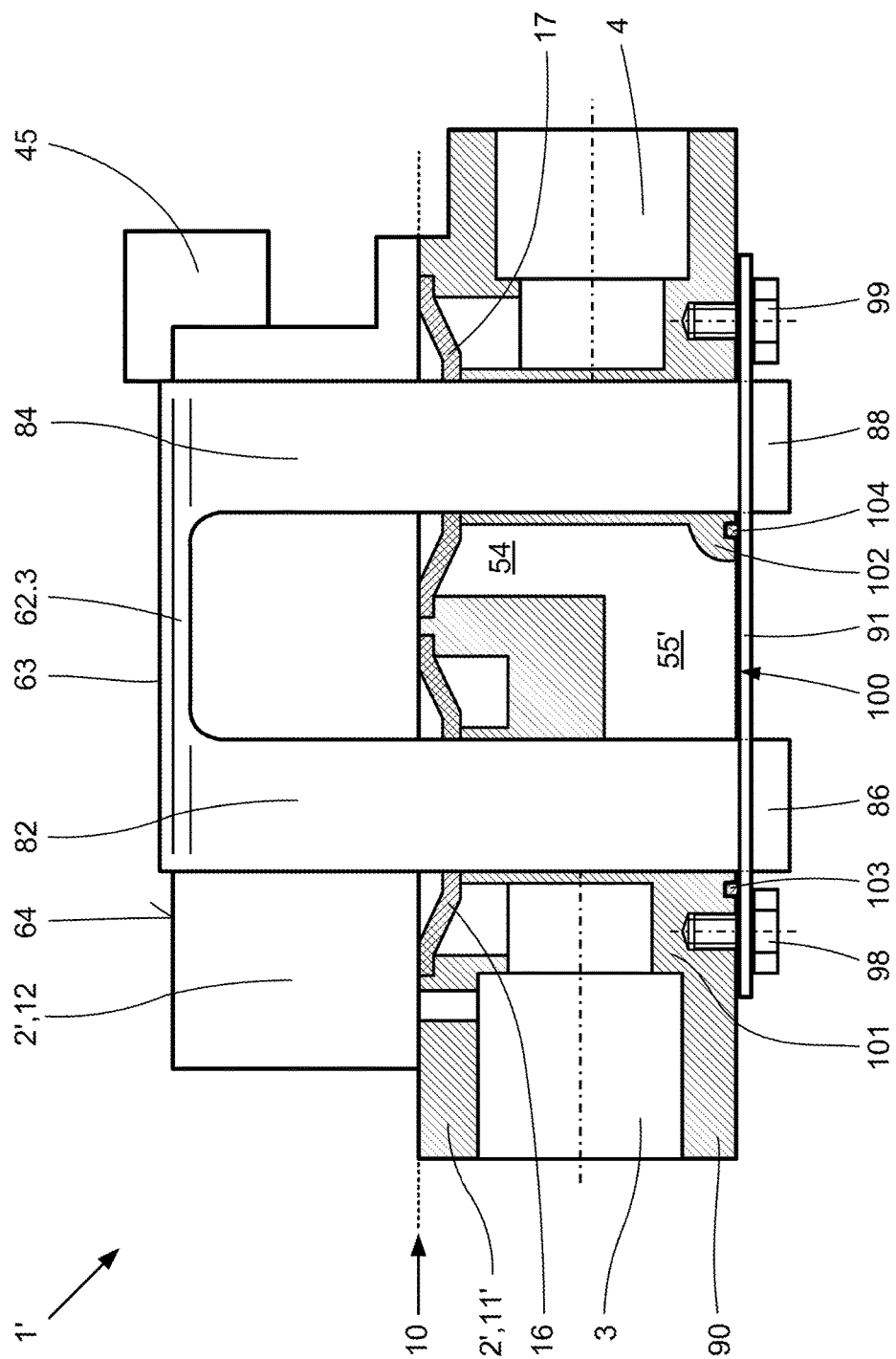
FIG. 5 shows a partially sectional side view of a valve unit with the bracket element according to FIG. 4.

A third embodiment of a bracket element 62.3 depicted in FIG. 4 and FIG. 5 differs from the first two embodiments according to FIGS. 1 to 3 in that the bracket element 62.3 in the longitudinal direction 13 of the valve housing 2' is now provided with two fixing arms 82, 84; 83, 85 on each side, which laterally enclose the housing cover 12 and the main housing 11' and with inwardly elbowed bends 86, 88: 87, 89 each grip around a largely planar base wall 90 of the main housing 11' remote from the plane of division 10, and at the end engage in assigned openings 92, 94; 93, 95 in a planar base plate 91, which is fixed to the base wall 90 of the main housing 11'.

To assemble the bracket element 62.3 according to FIG. 4 and FIG. 5, the fixing arms 82, 84; 83, 85 are tensioned and pushed over the outside edge of the base wall 90 of the main housing 11'. This also serves to generate the prestressing force between the pressure plate 63 of the bracket element 62.3 and the outside wall 64 of the housing cover 12. The fixing arms 82, 84; 83, 85 are then secured through positive interlock by pushing the base plate 91 on and fixing it, engaging in the slot-shaped openings 92, 94; 93, 95. The base plate 91 in the longitudinal direction 13 has a hole 96, 97 on each side, which serves for bolting the base plate 91 to the main housing 11' via a bolt 98, 99 in each case. The bracket element 62.3 with the four fixing arms 82, 84; 83, 85 and the base plate 91 are preferably manufactured in one piece at a time as a sheet-metal pressing and sheet-metal stamping and therefore are of cost-effective and compact design.

In the side view represented in FIG. 5 the valve unit 1' is depicted in the assembled state with the bracket element 62.3 and the base plate 91. In this Figure the main housing 11' is represented in section in order to illustrate an example of an embodiment differing from the main housing 11 of the valve unit 1 according to the FIGS. 8 to 10. In contrast to the outwardly closed connecting duct 55 there, via which the central duct 48 of the inlet valve 6 is connected to the ring duct 54 of the outlet valve 7, the connecting duct 55' is now of outwardly open construction by reason of an opening 100 in the base wall 90 of the main housing 11' made in the production process. The base plate 91, which of itself serves only for fixing the bracket element 62.3, now fulfils the additional function of outwardly closing the connecting duct 55' in the assembled state. For sealing off the connecting duct 55', sealing elements 103, 104, which here are embodied as sealing strips inserted in transverse grooves in the housing wall 101, 102, for example, are arranged between the housing walls 101, 102, which serve to define the connecting duct 55', and the base plate 91.

Figure 6:
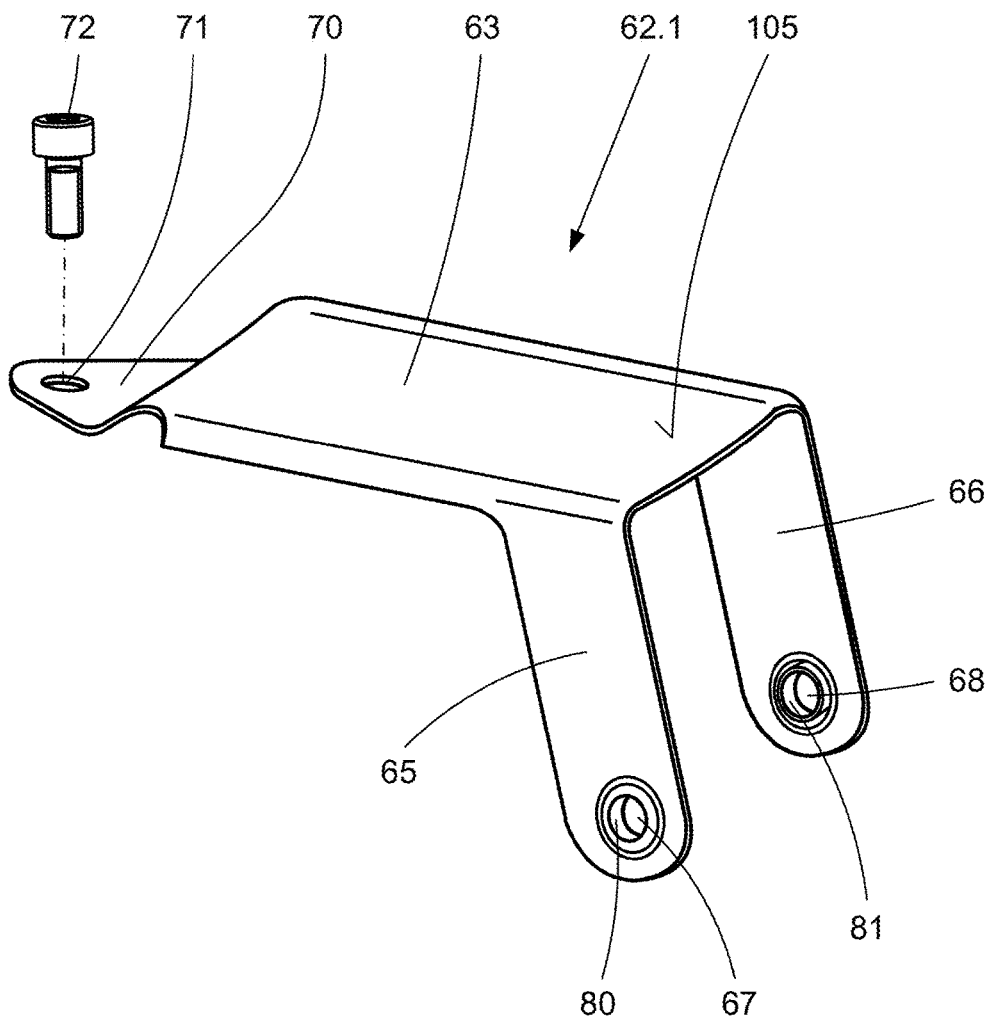
FIG. 6 shows a perspective view of a first development of the bracket element according to FIGS. 1 and 2.

Taking the first embodiment of the bracket element 62.1 in FIGS. 1 and 2, as an example, FIG. 6 shows that the pressure plate 63 of the bracket element 62.1 may be of arched design for the central introduction of an elastic prestressing force in the direction of the outside wall 64 of the housing cover 12. This arching is clearly discernible at the end and is marked by reference numeral 105.

Figure 7:
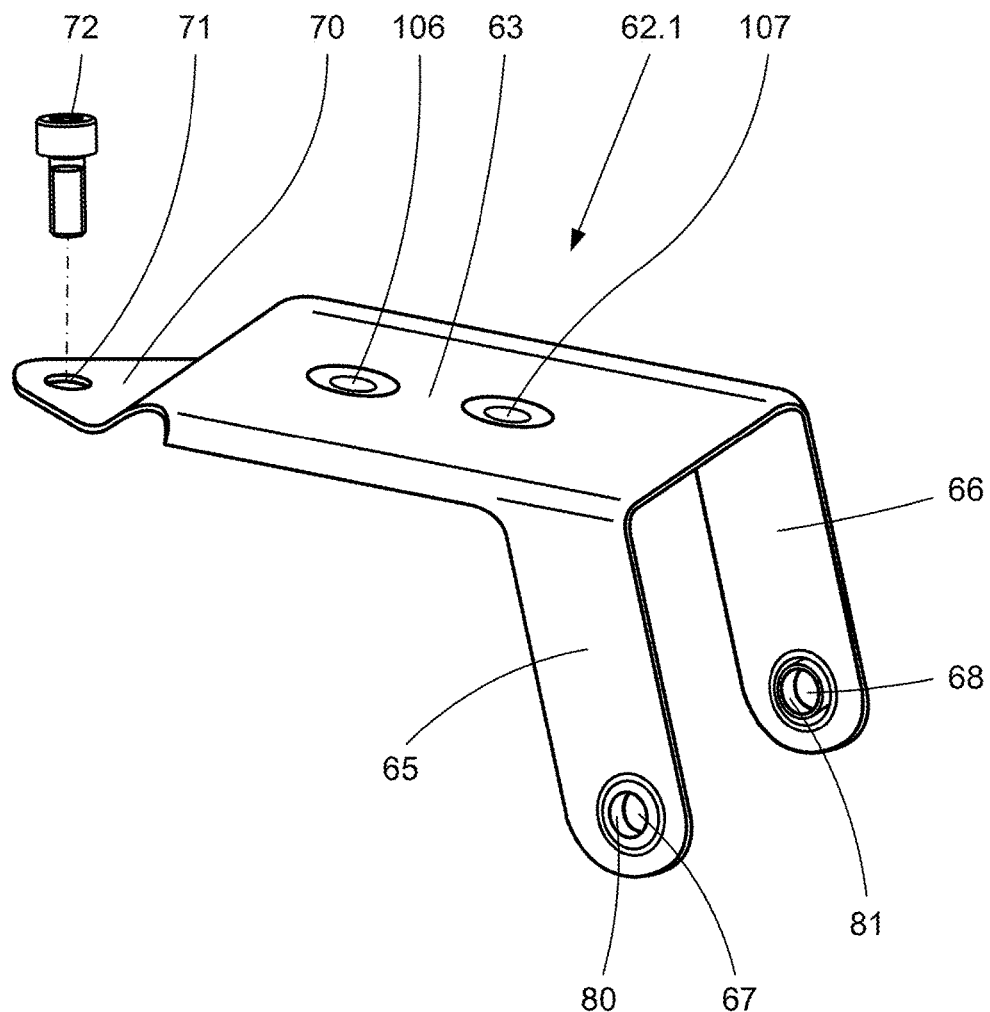
FIG. 7 shows a perspective view of a second development of the bracket element according to FIGS. 1 and 2.

In the depiction in FIG. 7, for example, the pressure plate 63 of the first embodiment of the bracket element 62.1 according to FIG. 1 and FIG. 2 comprises two convexities 106, 107 directed towards the outside wall 64 of the housing cover 12 for the localized introduction of an elastic prestressing force. These convexities 106, 107 are preferably positioned and formed in the pressure plate 63 in such a way that in the assembled state of the bracket element 62.1 they lie largely centrally over the control cambers 51, 52 of the diaphragm valves 6, 7 delimited by the inside wall 50 of the housing cover 12, thereby affording an optimal introduction of the prestressing force into the housing cover 12.

The arching 105 of the pressure plate 63 and the convexities 106, 107 in the pressure plate 63 may equally well be used in the second embodiment of the bracket element 62.2 according to FIG. 3 and in the third embodiment of the bracket element 62.3 according to FIGS. 4 and 5.

While the above description constitutes the preferred embodiments of the present invention, it will be appreciated that the invention is susceptible to modification, variation and change without departing from the proper scope and fair meaning of the accompanying claims.

The invention claimed is:

1. A valve unit (1, 1') for modulating pressure in a pneumatic brake system, comprising:
   a brake pressure inlet (3),
   a brake pressure outlet (4),
   a venting outlet (5),
   a main valve (6, 7), which is pneumatically controllable,
   a pilot valve (8, 9), embodied as a solenoid valve and assigned to the main valve (6, 7), and
   a valve housing (2, 2') accommodating the main valve and the pilot valve, the valve housing being subdivided by a plane of division (10), extending horizontally in an installed position, into a main housing (11, 11') and a housing cover (12),
   wherein the brake pressure inlet (3), the brake pressure outlet (4) and the venting outlet (5) are arranged in the main housing (11), the main valve (6, 7) is arranged in the main housing (11) between the brake pressure inlet (3) and the brake pressure outlet (4) with an actuation axis (14, 15) oriented perpendicular to the plane of division (10), the pilot valve (8, 9) is arranged in the housing cover (12), and at least one control chamber (51, 52) of the main valve (6, 7) is delimited by an inside wall (50) of the housing cover (12) facing the plane of division (10),
   wherein a bracket element (62.1, 62.2, 62.3) affixes the housing cover (12) on the main housing (11, 11'), which in an assembled state is fixed to the main housing (11, 11'), and which bears with a pressure plate (63) generating an elastic prestressing force on a planar outside wall (64) of the housing cover (12) oriented parallel to the plane of division (10) of the valve housing (2, 2'),
   wherein the bracket element (62.1, 62.2) includes two articulated arms (65, 66) on opposite sides of the valve housing (2, 2') in the longitudinal direction (13), the articulated arms laterally enclosing the housing cover (12) and the main housing (11) and being pivotally fixed to the main housing (12) via an axis of articulation

(69) engaging in an articulation hole (67, 68), and wherein in a longitudinal direction (13) opposite the articulated arms (65, 66), the bracket element (62.1, 62.2) is rigidly fixed to the main housing (11).

2. The valve unit as claimed in claim 1, wherein the bracket element (62.1), in a longitudinal direction (13) opposite the articulated arms (65, 66), includes a fixing clip (70), which is oriented parallel to the pressure plate (63) and has at least one hole (71), which serves for bolting the bracket element (62.1) to the main housing (11) by a bolt (72) and generating an elastic prestressing force.

3. The valve unit as claimed in claim 2, wherein the main housing (11), in a longitudinal direction (13) opposite the axis of articulation (69), comprises a columnar projection (73), which extends vertically above the plane of division (10) and includes at least one threaded hole (74) for bolted fastening of the fixing clip (70).

4. The valve unit as claimed in claim 1, wherein the bracket element (62.2), in a longitudinal direction (13) opposite the articulated arms (65, 66), includes a fixing clip (76), which is bent transversely to the pressure plate (63) and which comprises a locking hook (77), directed inwards for latching the bracket element (62.2) to the main housing (11) through engagement in an opposing latching recess (79) and by generating an elastic prestressing force.

5. The valve unit as claimed in claim 4, wherein the main housing (11), in a longitudinal direction (13) opposite the axis of articulation (69), comprises a planar projection (78), which extends perpendicularly beyond the plane of division (10) and includes—the latching recess (79) for latching of the fixing clip (76).

6. The valve unit as claimed in claim 1, wherein the bracket element (62.1, 62.2) is monolithically manufactured with the pressure plate (63), the articulated arms (65, 66), and the fixing clip (70, 76) from sheet-metal.

7. The valve unit as claimed in claim 1, wherein the articulation holes (67, 68) in the articulated arms (65, 66) each—include a cylindrical passage (80, 81).

8. The valve unit as claimed in claim 1, wherein the pressure plate (63) of the bracket element (62.1) is arched (105) in the direction of the outside wall (64) of the housing cover (12) in order to afford a central introduction of an elastic prestressing force.

9. The valve unit as claimed in claim 1, wherein the pressure plate (63) of the bracket element (62.1) comprises at least one convexity (106, 107) directed towards the outside wall (64) of the housing cover (12) for localized introduction of an elastic prestressing force.

10. The valve unit as claimed in claim 9, wherein the convexity (106, 107) is positioned and formed in the pressure plate (63) in such a way that in the assembled state of the bracket element (62.1), the convexity extends across a control chamber (51, 52) of the main valve (6, 7), the control chamber (51, 52) being delimited by the inside wall (50) of the housing cover (12).

11. A valve unit (1, 1') for modulating pressure in a pneumatic brake system, comprising:
a brake pressure inlet (3),
a brake pressure outlet (4),
a venting outlet (5),
a main valve (6, 7), which is pneumatically controllable,
a pilot valve (8, 9), embodied as a solenoid valve and assigned to the main valve (6, 7), and
a valve housing (2, 2') accommodating the main valve and the pilot valve, the valve housing being subdivided by a plane of division (10), extending horizontally in an installed position, into a main housing (11, 11') and a housing cover (12),
wherein the brake pressure inlet (3), the brake pressure outlet (4) and the venting outlet (5) are arranged in the main housing (11), the main valve (6, 7) is arranged in the main housing (11) between the brake pressure inlet (3) and the brake pressure outlet (4) with an actuation axis (14, 15) oriented perpendicular to the plane of division (10), the pilot valve (8, 9) is arranged in the housing cover (12), and at least one control chamber (51, 52) of the main valve (6, 7) is delimited by an inside wall (50) of the housing cover (12) facing the plane of division (10),
wherein a bracket element (62.1, 62.2, 62.3) affixes the housing cover (12) on the main housing (11, 11'), which in an assembled state is fixed to the main housing (11, 11'), and which bears with a pressure plate (63) generating an elastic prestressing force on a planar outside wall (64) of the housing cover (12) oriented parallel to the plane of division (10) of the valve housing (2, 2'),
wherein the brake pressure inlet (3) and the brake pressure outlet (4) are horizontally oriented in the main housing (11), axially opposite in a longitudinal direction (13) and with the venting outlet (5) directed vertically downwards between the brake pressure inlet (3) and the brake pressure outlet (4).

12. The valve unit as claimed in claim 11, wherein the bracket element (62.3) in the longitudinal direction (13) of the valve housing (2') has two fixing arms (82-85) on each side, which laterally enclose the housing cover (12) and the main housing (11') and with inwardly elbowed bends (86-89), which grip around a planar base wall (90) of the main housing (11') remote from the plane of division (10), and at the end engage in assigned openings (92-95) in a planar base plate (91), which is fixed to the base wall (90) of the main housing (11').

13. The valve unit as claimed in claim 12, wherein the base plate (91) has at least one hole (96, 97) on each side in a longitudinal direction (13), which serves for bolted fastening of the base plate (91) to the main housing (11') by a bolt (98, 99) on each side.

14. The valve unit as claimed in claim 12, wherein in the assembled state at least one outwardly open connecting duct (55') in the main housing (11') is closed by the base plate (91), and wherein sealing elements (103, 104) are arranged between housing walls (101, 102) of the main housing (11'), defining the connecting duct (55'), and the base plate (91).

15. The valve unit as claimed in claim 12, wherein the bracket element (62.3), the fixing arms (82-85), and the base plate (91) are monolithically manufactured of one piece of sheet metal.

16. A valve unit (1, 1') for modulating pressure in a pneumatic brake system, comprising:
a brake pressure inlet (3),
a brake pressure outlet (4),
a venting outlet (5),
a main valve (6, 7), which is pneumatically controllable,
a pilot valve (8, 9), embodied as a solenoid valve and assigned to the main valve (6, 7), and
a valve housing (2, 2') accommodating the main valve and the pilot valve, the valve housing being subdivided by a plane of division (10), extending horizontally in an installed position, into a main housing (11, 11') and a housing cover (12),
wherein the brake pressure inlet (3), the brake pressure outlet (4) and the venting outlet (5) are arranged in the main housing (11), the main valve (6, 7) is arranged in the main housing (11) between the brake pressure inlet (3) and the brake pressure outlet (4) with an actuation axis (14, 15) oriented perpendicular to the plane of division (10), the pilot valve (8, 9) is arranged in the housing cover (12), and at least one control chamber (51, 52) of the main valve (6, 7) is delimited by an inside wall (50) of the housing cover (12) facing the plane of division (10), wherein a bracket element (62.1, 62.2, 62.3) affixes the housing cover (12) on the main housing (11, 11'), which in an assembled state is fixed to the main housing (11, 11'), and which bears with a pressure plate (63) generating an elastic prestressing force on a planar outside wall (64) of the housing cover (12) oriented parallel to the plane of division (10) of the valve housing (2, 2'), wherein the housing cover (12) comprises a central insert (30), with valve bores (20, 21; 22, 23) and control ports (24, 25, 26; 27, 28, 29) accommodating solenoids (31, 32) and mechanical components of the pilot valves (8, 9), including a respective valve core (33, 36), a respective valve armature (34, 37), and a respective valve spring (35, 38), the central insert (30) being overmolded with plastic (39).

* * * * *